March 15, 1927.  
W. J. MILLER  
1,621,426  
APPARATUS FOR PRODUCING MOLD CHARGES OF MOLTEN GLASS  
Original Filed Sept. 23, 1919  2 Sheets-Sheet 2

Inventor  
Wm. J. Miller  
by Robert S. Brown  
Attorney.

Patented Mar. 15, 1927.

1,621,426

UNITED STATES PATENT OFFICE.

WILLIAM J. MILLER, OF SWISSVALE, PENNSYLVANIA, ASSIGNOR TO HARTFORD-EMPIRE COMPANY, OF HARTFORD, CONNECTICUT, A CORPORATION OF DELAWARE.

APPARATUS FOR PRODUCING MOLD CHARGES OF MOLTEN GLASS.

Original application filed September 23, 1919, Serial No. 325,616. Divided and this application filed April 1, 1926. Serial No. 98,983.

This application is a division of my patent application Serial Number 325616, filed in the United States Patent Office on September 23, 1919.

In general, my invention relates to apparatus, for producing a succession of mold charges of molten glass, of the type wherein a rigid implement or plunger is caused to reciprocate in the molten glass in the receptacle moving toward and away from the outlet port of the receptacle for the control of the discharge of glass from such port.

More particularly my present invention relates to the plunger mounting and the adjustment and regulation of plunger movement toward and away from the outlet, and I provide new and improved means for that purpose.

Figure 1:
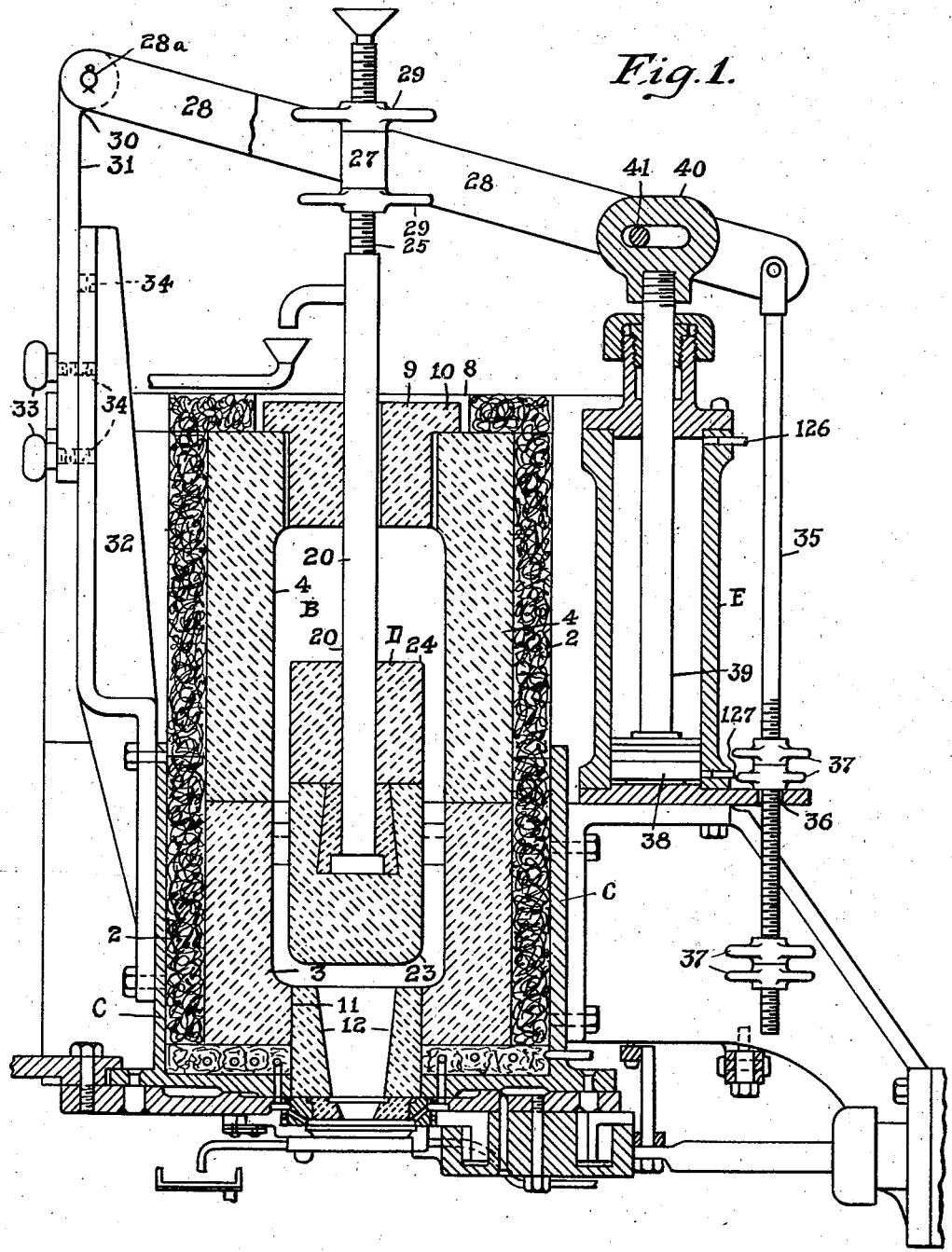
Figure 2:
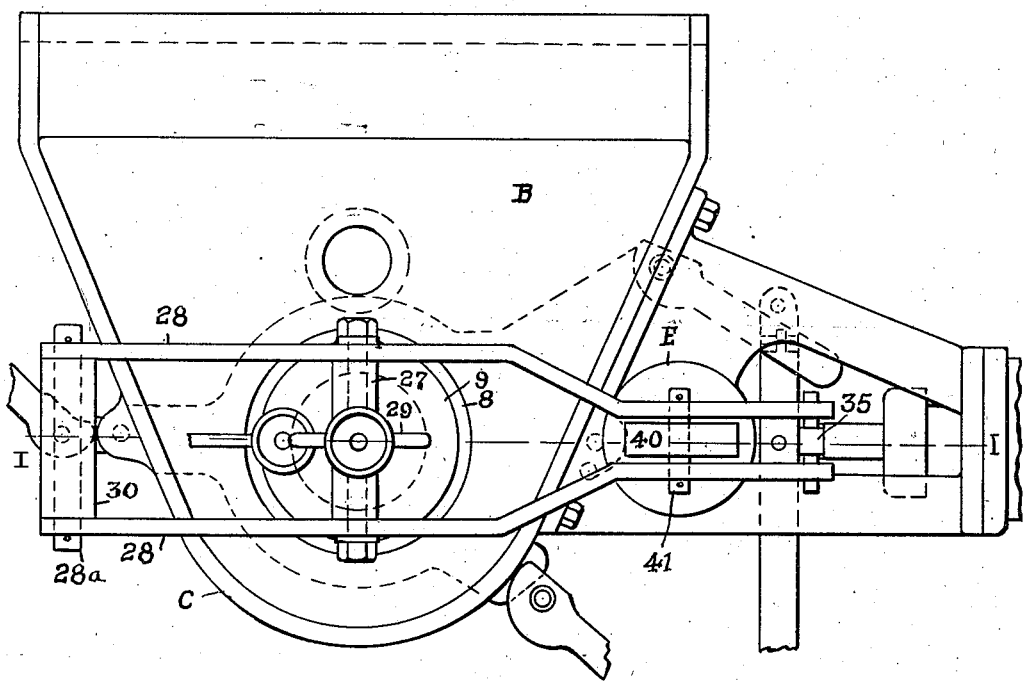

In the accompanying drawings, wherein I have illustrated the best embodiment of the principles of my invention now known to me, Fig. 1 is a vertical section of an apparatus for producing a succession of mold charges of molten glass, the view being taken along the line I—I in Fig. 2, and Fig. 2 is a plan view of the same.

Referring to the drawings, B is a receptacle for the molten glass, usually a shallow extension or boot receiving its supply of glass from the main melting tank or other source of supply, not shown. The boot is shown supported by the metal casing or box C.

8 is an opening in the roof of the boot and provided with an annular plug or bushing 9 having a circumferential top flange 10 by means of which the plug is supported in the opening.

11 is an opening in the bottom of the boot which is vertically alined with the roof opening 8. The opening 11 is provided with a clay bushing 12 whose bore is downwardly tapering and forms the discharge port of the boot. In the drawings I have shown the discharge port in the floor or bottom of the boot, and am thus enabled to take advantage of the gravity flow of the molten glass in discharging the latter from the boot, but it will be understood that the discharge port may be horizontally positioned in the wall of the boot, if so desired, in which case the plunger would be positioned in alinement with the discharge port.

D is the plunger working in the glass in the boot in alinement with the openings 8 and 11. The plunger is shown comprised of a depending stem 20 upon which the refractory clay blocks 23 and 24 are mounted.

The stem 20 protrudes upwardly through the bore of the plug 9 and is provided with a threaded upper end portion 25 which extends through a circular opening in a cross-head 27 whose ends are pivotally journaled in the parallel walking bars 28. 29 represents adjusting nuts screwed on the threaded portion of the stem 20 above and below the cross-head 27, whereby the position of the plunger may be adjusted relative to the walking bars by raising or lowering it in the cross-head 27.

The walking bars 28 are connected together to move in unison and are fulcrumed at their one end by being pivotally mounted on the protruding ends of a pivot pin 28ª which is journaled intermediate of its ends in a sleeve bearing 30 carried by the upper end of a post 31 which is attached to the stationary bracket 32 by means of screws 33 inserted through holes in the post 31 and screwed into threaded holes 34 in the bracket 32. A plurality of such holes 34 at different elevations are provided, so that the post may be raised or lowered for adjusting the elevation of the fulcrum of the walking bars. Thus for instance, the plunger may be elevated out of the glass or out of the way of the heating flames when necessary.

The throw of the walking bars, and thus the upper and lower limits of the movement of the plunger may be adjusted by means of a rod 35 pivotally depending from the free end of the walking bars and depending through an opening 36 in an abutment such as an extension of a fixed portion of the structure. 37 represents upper and lower limiting nuts which are screwed on the rod 35 above and below the abutment and which thus determine the limits of movements of the plunger toward and away from the discharge port, respectively. By adjusting the proper limiting-nut on the rod, either the position of the plunger nearest to or most remote from the port may be independently adjusted, and such adjustment may be made while the feeder is in operation and without disturbing its driving connections.

I provide fluid-pressure means for reciprocating the plunger, such means being preferably a double-acting cylinder and piston mechanism.

Thus E is a vertically disposed fluid-pressure cylinder mounted on the boot structure and having a double acting piston 38 whose rod 39 protrudes through a gland in the upper end of the cylinder and is provided with a head 40 having a horizontally slotted opening to receive a pin 41 spanning the space between the walking bars 28 and having its end inserted in the latter.

126 is a pipe connected to the upper end of the cylinder E and 127 is a similar pipe connected to the lower end of the cylinder. For the downward movement of the piston the pipe 126 admits pressure and the pipe 127 relieves pressure, while for the upward movement of the piston the pipe 127 admits pressure and the pipe 126 relieves pressure.

It is evident that when pressure is admitted to the lower end of the cylinder E and relieved from the upper end thereof, the plunger will be raised, and that the plunger will be lowered when pressure is admitted to the upper end of the cylinder and relieved from its lower end, the path or range of movement of the plunger and its position nearest to and farthest from the discharge port being regulated by the adjustment of the limiting nuts 37 on the rod 35.

The downward movement of the plunger acts to accelerate the discharge of glass from the discharge port while its upward movement checks the outflow of the glass and tends to reverse the direction of its travel in the discharge port.

By means of the adjustments provided for regulating the plunger movements the quantity of glass discharged may be varied and also the form or shape which is imparted to the extruded mass of glass before it is detached.

The use of fluid-pressure means for moving the plunger toward and away from the discharge port has a particular utility, especially in combination with the limiting nuts or stops working in relation to the abutment. It is apparent that any unyieldingly positive means for moving the plunger could not readily be combined with adjustable limiting stops without danger of breakage or injurious jarring of the mechanism. Fluid-pressure, however, affords an efficient means for positively raising and lowering the plunger while at the same time, owing to its elasticity, permitting the movements of the plunger to be adjustably limited.

The present divisional application is filed for the purpose of claiming the means disclosed in the original application for adjustably mounting and reciprocating the plunger which controls the discharge of the glass, and for adjustably determining the stroke of that plunger. Other novel features disclosed in the original application, Serial No. 325,616, some of which are also disclosed in the present application, are not claimed herein but are claimed either in the original application or in other divisions thereof.

What I desire to claim is:

1. In apparatus for feeding molten glass in a succession of mold charges, the combination with a receptacle for molten glass provided with a discharge outlet, of a vertically reciprocating implement working in the glass in said receptacle to control the discharge of glass through said outlet without seating at the outlet, means for imparting a reciprocating movement to said implement, means for limiting the reciprocating movement of said implement comprising an element moving in unison with said implement and adjacent to an abutment, and adjustable stop members at opposite sides of said abutment to limit the motion of said element relative to the abutment.

2. In apparatus for feeding molten glass in a succession of mold charges, the combination with a receptacle for molten glass provided with a discharge outlet, of a vertically reciprocating implement working in the glass in said receptacle to control the discharge of glass through said outlet without seating at the outlet, means for imparting a reciprocating movement to said implement, means for limiting the reciprocating movement of said implement comprising an element moving with said implement and adjacent to an abutment, and stop members disposed at opposite sides of said abutment to limit the movement of the element, the relation between said stop members and said abutment being adjustable whereby the path of movement of said implement may be varied.

3. In apparatus for feeding molten glass in a succession of mold charges, the combination with a receptacle for molten glass provided with a discharge outlet, of a vertically reciprocating implement working in the glass in said receptacle to control the discharge of glass through said outlet without seating at the outlet, means for imparting a reciprocating movement to said implement, and means for limiting the reciprocating movement of said implement and comprising an element moving with said implement and adjacent to an abutment, and stop members disposed at opposite sides of said abutment to limit the movement of said element relative to the abutment, the relation of one of said stop members to said abutment being adjustable whereby the limit of movement of said implement toward the outlet may be varied without changing its limit of movement away from the outlet.

4. In apparatus for feeding molten glass in a succession of mold charges, the combination with a receptacle for molten glass provided with a discharge outlet, of a vertically reciprocating implement working in the glass in said receptacle to control the discharge of glass through said outlet without seating at the outlet, means for imparting a reciprocating movement to said implement, and means for limiting the reciprocating movement of said implement and comprising an element moving with said implement and adjacent to an abutment, and stop members disposed at opposite sides of said abutment to limit the movement of the element relative to the abutment, the relation of one of said stop members to the abutment being adjustable whereby the limit of the movement of said implement away from the outlet may be varied without changing the limit of its movement toward the outlet.

5. In apparatus for feeding molten glass in a succession of mold charges, the combination with a receptacle for molten glass provided with a discharge outlet, of a vertically reciprocating implement working in the glass in said receptacle to control the discharge of glass through said outlet without seating at the outlet, means for imparting a reciprocating movement to said implement, and means for limiting the reciprocating movement of said implement and comprising an element moving with said implement and adjacent to an abutment, and stop members disposed at opposite sides of said abutment to limit the movement of the element relative to the abutment, the relation between the abutment and each of said stop members being individually adjustable without changing the relation between the abutment and the other stop member whereby the limit of the movement of said implement in either direction may be varied without changing the limit of its movement in the opposite direction.

6. In apparatus for feeding molten glass in a succession of mold charges, the combination with a receptacle for molten glass provided with a discharge outlet, of a vertically reciprocating implement working in the glass in said receptacle to control the discharge of glass through said outlet without seating at the outlet, fluid-pressure means for imparting a reciprocating movement to said implement, and means for limiting the reciprocating movement of said implement and comprising an element moving with said implement and adjacent to an abutment, and stop members disposed on opposite sides of said abutment and arranged to limit the movement of the implement relative to the abutment, the relation between the stop members and the abutment being adjustable whereby the path of movement of the implement may be varied.

7. In apparatus for feeding molten glass in a succession of mold charges, the combination with a receptacle for molten glass provided with a discharge outlet, of a vertically reciprocating implement working in the glass in said receptacle to control the discharge of glass through said outlet without seating at the outlet, fluid-pressure means for imparting a reciprocating movement to said implement, and means for limiting the reciprocating movement of said implement and comprising an element moving with said implement and adjacent to an abutment, and stop members disposed one above and one below said abutment and arranged to limit the movement of the element relative to the abutment, the relation between the upper stop member and the abutment being adjustable whereby the limit of movement of said implement toward the outlet may be varied without changing its limit of movement away from the outlet.

8. In apparatus for feeding molten glass in a succession of mold charges, the combination with a receptacle for molten glass provided with a discharge outlet, of a vertically reciprocating implement working in the glass in said receptacle to control the discharge of glass through said outlet without seating at the outlet, fluid-pressure means for imparting a reciprocating movement to said implement, and means for limiting the reciprocating movement of said implement and comprising an element moving with said implement and adjacent to an abutment, and stop members disposed one above and one below said abutment and arranged to limit the movement of the element relative to the abutment, the relation between the lower stop member and the abutment being adjustable whereby the limit of movement of said implement away from the outlet may be varied without changing the limit of its movement toward the outlet.

9. In apparatus for feeding molten glass in a succession of mold charges, the combination with a receptacle for molten glass provided with a discharge outlet, of a vertically reciprocating implement working in the glass in said receptacle to control the discharge of glass through said outlet without seating at the outlet, fluid-pressure means for imparting a reciprocating movement to said implement, and means for limiting the reciprocating movement of said implement and comprising an element moving with said implement and adjacent to an abutment, and stop members disposed on opposite sides of said abutment and arranged to limit the movement of the element, the relation between each of said stop members and the abutment being individually adjustable whereby the limit of movement of said implement in one direction may be varied without changing its limit of movement in the other direction.

10. In apparatus for feeding molten glass in a succession of mold charges, the combination with a receptacle for molten glass provided with a submerged discharge outlet, a vertically reciprocating implement working in the glass to control the discharge of glass through said outlet and means for moving said implement toward and away from the outlet, of means for limiting the reciprocating movement of said implement comprising a rod moving with said implement and in relation to an abutment, and stop members on said rod above and below said abutment and arranged to be brought alternately into engagement with said abutment to limit the movement of the implement toward and away from said outlet.

11. In apparatus for feeding molten glass in a succession of mold charges, the combination with a receptacle for molten glass provided with a submerged discharge outlet, a vertically reciprocating implement working in the glass to control the discharge of glass through said outlet and means for moving said implement toward and away from the outlet, of means for limiting the reciprocating movement of said implement comprising a rod moving with said implement and in relation to an abutment, and stop members on said rod above and below said abutment and arranged to be brought alternately into engagement with said abutment to limit the movement of the implement toward and away from said outlet, said stop members being adjustable on said rod so as to provide means for varying the path of movement of said implement.

12. In apparatus for feeding molten glass in a succession of mold charges, the combination with a receptacle for molten glass provided with a submerged discharge outlet, a vertically reciprocating implement working in the glass to control the discharge of glass through said outlet and means for moving said implement toward and away from the outlet, of means for limiting the reciprocating movement of said implement comprising a rod moving with said implement and in relation to an abutment, and stop members on said rod above and below said abutment and arranged to be brought alternately into engagement with said abutment to limit the movement of the implement toward and away from said outlet, said stop members being individually adjustable on said rod so as to provide means for independently varying the positions of said implement nearest to and remote from the outlet.

13. In apparatus for feeding molten glass in a succession of mold charges, the combination with a receptacle for molten glass provided with a submerged discharge outlet, a vertically reciprocating implement working in the glass to control the discharge of glass through said outlet and means for moving said implement toward and away from the outlet, of means for limiting the reciprocating movement of said implement comprising a screw rod moving with said implement and in relation to an abutment, and limiting nuts on said screw rod above and below said abutment and arranged to be brought into engagement with said abutment to limit the positions of the implement nearest to and remote from the outlet.

14. In apparatus for feeding molten glass in a succession of mold charges, the combination with a receptacle for molten glass provided with a submerged discharge outlet, a vertically reciprocating implement working in the glass to control the discharge of glass through said outlet, and means for moving the implement toward and away from the outlet, of means for limiting the movement of said implement comprising a rod moving with said implement and in relation to an abutment, and a stop member carried by said rod and adjustable along the length of said rod and arranged to be brought by the movement of the implement into engagement with the abutment to limit the movement of the implement.

15. In apparatus for feeding molten glass in a succession of mold charges, the combination with a receptacle for molten glass provided with a submerged discharge outlet, a vertically reciprocating implement working in the glass to control the discharge of glass through said outlet, and means for moving the implement toward and away from the outlet, of means for limiting the movement of said implement, comprising a screw-rod moving with said implement and in relation to an abutment, and a limiting nut on said rod arranged to be brought into engagement with the abutment by the movement of the implement.

16. In apparatus for feeding molten glass in a succession of mold charges or gathers, the combination of a receptacle for the glass provided with a submerged discharge outlet, a rigid implement working in the glass in said receptacle to control the discharge of glass through said outlet, and means for reciprocating said implement comprising a rocking member arranged for pivotal movement on a horizontal axis, power connections for rocking said member, means for suspending said implement from said rocking member between said horizontal axis and said power connections, and means for vertically adjusting the position of said implement with respect to said rocking member.

17. In apparatus for feeding molten glass in a succession of mold charges or gathers, the combination of a receptacle for the glass provided with a submerged discharge outlet, a rigid implement working in the glass in said receptacle to control the discharge of glass through said outlet, means for reciprocating said implement comprising a rocking member arranged for pivotal movement on a horizontal axis, power connections for rocking said member, and means for suspending said implement from said rocking member between said horizontal axis and the said power connections, and means for adjustably limiting the rocking movement of said member, comprising a member movable with said rocking member and extending adjacent to a fixed abutment, and stop members adjustably mounted on said member and disposed on opposite sides of said abutment.

18. In apparatus for feeding molten glass in a succession of mold charges or gathers, the combination of a receptacle for the glass provided with a submerged discharge outlet, a rigid implement working in the glass in said receptacle to control the discharge of glass through said outlet, means for reciprocating said implement comprising a rocking member arranged for pivotal movement on a horizontal axis, power connections for rocking said member, means for suspending said implement from said rocking member between said horizontal axis and the said power connections, and means for adjustably limiting the rocking movement of said member, comprising a member depending from said rocking member and having a screw-threaded portion extending adjacent to a fixed abutment, and nuts carried by the screw-threaded portion of said member and disposed above and below said abutment.

19. In apparatus for feeding molten glass in a succession of mold charges or gathers, the combination of a receptacle for the glass provided with a submerged discharge outlet, a rigid implement working in the glass in said receptacle to control the discharge of glass through said outlet, means for reciprocating said implement comprising a rocking member arranged for pivotal movement on a horizontal axis, power connections for rocking said member, means for suspending said implement from said rocking member between said horizontal axis and the said power connections, means for vertically adjusting the position of said horizontal axis, means for vertically adjusting the position of said implement with respect to said rocking member, and means for adjustably limiting the rocking movement of said rocking member comprising a member depending from said rocking member and having a screw-threaded portion extending adjacent to a fixed abutment, and nuts carried by the screw-threaded portion of said member and disposed above and below said abutment.

20. In apparatus for feeding molten glass in a succession of mold charges or gathers, the combination of a receptacle for the glass provided with a submerged discharge outlet, a rigid implement working in the glass in said receptacle to control the discharge of the glass through said outlet, and means for operating the implement, said means comprising a movable member, an implement support pivotally connected to said member, means for raising and lowering the implement relative to said implement support, and means for imparting movement to said member to move the implement toward and away from the outlet.

21. In apparatus for feeding molten glass in a succession of mold charges or gathers, the combination of a receptacle for the glass provided with a submerged discharge outlet, a rigid implement working in the glass in said receptacle to control the discharge of the glass through said outlet, and means for operating the implement, said means comprising a movable member, a sleeve pivotally connected to said member, the upper end of the implement being inserted in said sleeve and adjustable relative thereto, and means for imparting movement to said member to move the implement toward and away from the outlet.

22. In apparatus for feeding molten glass in a succession of mold charges or gathers, the combination of a receptacle for the glass provided with a submerged discharge outlet, a rigid implement working in the glass in said receptacle to control the discharge of the glass through said outlet, and means for operating the implement, said means comprising a movable member, a sleeve pivotally connected to said member, the upper end of the implement being inserted in said sleeve, nuts screwed on the implement and bearing on either end of the sleeve, and means for imparting movement to said member to move the implement toward and away from the outlet.

23. In apparatus for producing a succession of mold charges of molten glass, the combination with a receptacle for the molten glass having a submerged discharge outlet, of a rigid implement working in the glass to control the discharge of glass from said outlet, driving means including an oscillating lever for moving the implement toward and away from the outlet, and means for supporting and adjustably positioning the fulcrum of said lever, including a stationary bracket, a vertically adjustable post carrying said fulcrum, and means for securing said post to said bracket at various elevations.

24. Mechanism for supporting and reciprocating a glass feeding plunger comprising two laterally spaced rocking members arranged for pivotal movement upon a common axis, a sleeve spacing said members apart and forming a fulcrum bearing therefor, a cross-head also spacing said members apart and forming a suspension for said plunger, and means for rocking said members comprising a fluid-pressure cylinder, a piston and a piston rod, the said piston rod being connected to communicate rocking movement to said members.

25. Mechanism for supporting and reciprocating a glass feeding plunger comprising two laterally spaced rocking members both mounted for pivotal movement on a common axis at one end thereof and approaching each other to accommodate a power connection near the other end thereof, a sleeve spacing said members apart at the fulcrum thereof, a cross-head extending between said members and located between the ends thereof and arranged to suspend said plunger, and power connections for rocking said members comprising a fluid-pressure cylinder, a piston and a piston rod, the said piston rod being connected to the portions of said rocking members that are relatively close to each other.

26. Mechanism for supporting and reciprocating a glass feeding plunger comprising two laterally spaced rocking members both mounted for pivotal movement on a common axis at one end thereof and approaching each other to accommodate a power connection near the other end thereof, a sleeve spacing said members apart at the fulcrum thereof, a cross-head extending between said members and located between the ends thereof and arranged to suspend said plunger, power connections for rocking said members comprising a fluid-pressure cylinder, a piston and a piston rod, the said piston rod being connected to the portions of said rocking members that are relatively close to each other, and the said rocking members being extended beyond the connection with said piston rod and carrying a depending member, and means carried by said depending member for limiting the rocking movement of said rocking members.

Signed at Pittsburgh, Pa., this 29th day of March, 1926.

WILLIAM J. MILLER.